METHOD OF MANUFACTURING A LATEX HAVING HIGH CONCENTRATION OF POLYMER PARTICLES AND LOW VISCOSITY EMPLOYING SOLUBLE ALGINATE AND MAGNESIUM SALTS

Yoshihiko Araki, Yokohama, Hisatake Sato, Tokyo, and Mikio Takahashi, Yokohama, Japan, assignors to Nippon Oil Company, Limited, Tokyo, Japan
No Drawing. Filed Apr. 1, 1971, Ser. No. 130,495
Int. Cl. C08d 3/06, 9/06
U.S. Cl. 260—17.4 BB
2 Claims

ABSTRACT OF THE DISCLOSURE

A method of directly producing synthetic rubber latex having a high concentration of large polymer particles and a low viscosity characterized by polymerizing aliphatic conjugated diolefin or a mixture of aliphatic conjugated diolefin and vinyl compound using fatty acid soap, rosin soap or a mixture thereof as the emulsifier, in the presence of water-soluble alginate and water-soluble magnesium salt.

BACKGROUND OF THE INVENTION

(1) Field of the invention

The present invention concerns with a method of manufacturing synthetic rubber latex having high concentration of polymer particles and low viscosity by polymerizing aliphatic conjugated diolefin or a mixture of aliphatic conjugated diolefin and vinyl compound.

(2) Description of the prior art

The so-called synthetic rubber latex having high concentration of polymer particles with high solid content is widely utilized for foam rubber, the surface finishing of paper and fabrics, paints, adhesives and binders, and, at the same time, contributes to the reduction in transportion cost of latex.

For the above applications, low viscosity is preferred. And it is well known in the art that increase in the particle size of polymer contained in latex and improvement in the distribution pattern of the particle size are necessary in order to increase the solid content at a low viscosity.

In general, two methods are known to obtain latex with high concentration of polymer particles and low viscosity by means of increasing the particle size of synthetic rubber latex. One method is to manufacture latex with a small particle size at low concentration by conventional method and concentrate it to a desired level of concentration after, or along with, a physical or chemical treatment to cause cohesion of polymer particles.

This method, however, involves such problems as accompanying a danger of producing a large quantity of coagulated material which is undesirable from the economical point of view, or requiring various expensive and non-reclaimable additives causing a decrease in the purity of latex or additional costly equipments.

The other method produces latex having high concentration of polymer particles by polymerizing highly concentrated monomer, namely, while maintaining the ratio of monomer to water greater than one, in the presence of a small amount of emulsifier.

This method does not require special costly equipments, nor does require large amount of additives which would reduce the purity of latex. As being well known to those skilled in the art, however, the fault with this method is that essentially the reproducibility of polymer is poor since particles are placed on the border line of being stable and unstable in order to coalesce polymer particles during polymerization.

SUMMARY OF THE INVENTION

The purpose of this invention is to provide a new method of manufacturing synthetic rubber latex having high concentration of polymer particles and low viscosity, that improves the shortcomings of the conventional methods.

That is, the present invention will improve the disadvantages of the conventional method of directly manufacturing latex with high concentration of polymer particles and offers a new method of securely manufacturing latex having high concentration of polymer particles and low viscosity with good reproducibility. According to the method of the present invention, latex having high concentration of polymer particles and low viscosity (generally less than 1000 cps., especially less than 500 cps.) can be obtained with good reproducibility by polymerizing aliphatic conjugated diolefin or a mixture of aliphatic conjugated diolefin and vinyl compound in an emulsion polymerization system which contains a soap of fatty acids, rosin soap or a mixture thereof as an emulsifier, and water-soluble alginate and water-soluble magnesium salt as additives.

According to the method of the present invention, there is obtained latex containing, for example, higher than one weight percent of a polymer having a large particle size, e.g., larger than 0.8 micron in diameter.

Among water-soluble alginates, sodium alginate, ammonium alginate or magnesium alginate, etc. may be used in the present invention. The amount of these water-soluble alginate to be used is within the range from 0.00001 to 0.1 part by weight, preferably from 0.0001 to 0.001 part by weight, per 100 parts by weight of the monomer.

Among water-soluble magnesium salts to be used in the present invention, are magnesium chloride, magnesium bromide, magnesium sulfate, magnesium nitrate, magnesium chromate, magnesium formate, magnesium acetate, etc. These magnesium salts are used in an amount of $1 \times 10^{-5}$ to $1 \times 10^{-3}$ moles as magnesium ions per 100 parts by weight of the monomer. For example, anhydrous magnesium sulfate is used in the range from 0.0012 to 0.12 part, preferably from 0.006 to 0.06 part, per 100 parts by weight of the monomer.

The prominent feature of the present invention exists in the above two additives which are effective for only very small amounts to give latex of high purity and high hydrocarbon content.

Both the kind and the amount of monomers, the emulsifier, the modifier and the polymerization initiator being used in the present invention may be varied freely according to the desired characteristics and uses of the latex product.

The monomers to be used in the present invention include various types of diolefins such as butadiene, isoprene or mixtures thereof, mixtures of the above-mentioned various type of aliphatic conjugated diolefin by itself or a mixture thereof with one or more of vinyl compounds such as styrene, α-methylstyrene, divinylbenzene, acrylonitrile, acrylic acid, methacrylic acid and their alkyl esters in which the alkyl group contains up to four carbon atoms; such as n-butylacrylic acid ester.

The ratio of the monomer or the mixture of monomers to water may be maintained within the range of from 0.8 to 1.5, preefrably from 1.0 to 1.25. Higher ratios than specified above tend to give latex having a high gel content, while lower ratios may lead to latex of low concentration.

Among the emulsifier are alkali metal salts of higher fatty acids having from 8 to 20 carbon atoms per molecule, such as sodium caprate, sodium laurate, potassium oleate; ammonium salts such as ammonium stearate; and amine salts or alkali metal salt of rosin acid or mixture thereof. The above rosin acid includes dehydrogenated rosin acid, hydrogenated rosin acid and disproportionated rosin acid.

The modifier to be used in the present invention includes mercaptans such as n-dodecylmercaptan and t-dodecylmercaptan, diisopropylxanthogen, sulfur, and carbon tetrachloride. The polymerization initiator may be selected from persulfates such as potassium persulfate and ammonium persulfate.

The polymerization reaction temperature may also be selected within an arbitrary range according to the desired reaction rate. In general, 30° C. or above is commonly used and the temperature may be varied during polymerization.

Furthermore, the order of adding the water-soluble alginate and the water-soluble magnesium salt to the polymerization system is optional, and it is also possible to add one or both of the above to the system even after the initiation of the polymerization, preferably when an appropriate conversion of monomer has taken place not exceeding 40%.

The method of the present invention may take, in its operation, consecutive method, batch method or semi-batch method.

Following examples will explain the method of the present invention in more detail.

All parts that appear in comparative examples and examples below are by weight if not defined otherwise.

COMPARATIVE EXAMPLES 1–2

A mixture of 100 parts butadiene, 53 parts water, one part sodium rosinate, 0.25 part n-dodecylmercaptan and 0.3 part potassium persulfate was put in a 1 l. glass-lined autoclave provided with a stirrer and polymerization was started at 44° C. The temperature was gradually increased according to the method of the description on p. 649 of "Synthetic Rubber" written by Whitby. When the conversion of the butadiene reached 60%, a "Boster" consisting of a modifier, an initiator and an emulsifier, that is, 0.1 part n-dodecylmercaptan, 0.1 part potassium persulfate, 0.5 part potassium oleate and 4 parts water, as described by Smith et al., "India Rubber World," No. 113, p. 814 (1946), was added to the mixture and the polymerization was continued at 66° C. for 61 hours. Table 1 shows the results obtained by two experiments conducted under the same conditions.

TABLE 1

| Comparative examples | 1 | 2 |
|---|---|---|
| Polymerization time (hr.) | 61 | 60 |
| Total amount of solid (percent) | 59.3 | 60.5 |
| Viscosity* (cps.) | 650 | 3,500 |
| Viscosity at 55% total solid content (cps.) | 200 | 600 |
| Coagulated material | Some | None |

*Determined by Brookfield viscometer at 25° C. according to ASTM D1417-61. Same applies to comparative examples and examples described below.

It is apparent from Table 1 that the polymerization conditions employed in these comparative examples do not give latex having high concentration of polymer particles and low viscosity. Also the reproducibility is poor.

COMPARATIVE EXAMPLES 3–5

The method of Comparative Example 1 was followed except that required amounts of sodium alginate and potassium chloride were added to the mixture at the initiation of polymerization and the results of Table 2 were obtained.

TABLE 2

| Comparative examples | 3 | 4 | 5 |
|---|---|---|---|
| Sodium alginate (parts by weight) |  | 0.001 | 0.002 |
| Potassium chloride (parts by weight) | 0.1 | 0.1 | 0.2 |
| Polymerization time (hr.) | 3 | 62 | 63 |
| Total amount of solids (percent) |  | 60.7 | 57.0 |
| Viscosity (cps.) |  | 1,090 | 400 |
| Viscosity at 55% total solid content (cps.) |  | 310 | 190 |
| Coagulated material | (1) | Some | Abundant |

1 All coagulated.

Table 2 shows that when potassium chloride is used it should be added at a fairly large amount and coagulation takes place easily.

COMPARATIVE EXAMPLES 6–7

The polymerization was conducted following the method of Comparative Example 1 except that the reaction was initiated in the presence of either sodium alginate or magnesium sulfate. The results are shown in Table 3.

TABLE 3

| Comparative examples | 6 | 7 |
|---|---|---|
| Sodium alginate (parts by weight) | 0.001 |  |
| Magnesium sulfate (parts by weight) |  | 0.02 |
| Polymerization time (hr.) | 58 | 59 |
| Total solid amount (percent) | 58.8 | 56.5 |
| Viscosity (cps.) | 520 | 2,100 |
| Viscosity at 55% total solid content (cps.) | 250 | 510 |
| Coagulated material | Some | Some |

It is apparent from Table 3 that no latex having high content ratio of polymer particles and low viscosity is obtained when either sodium alginate or magnesium sulfate alone is present in the system.

EXAMPLES 1–2

The method of Comparative Example 1 was repeated except that sodium alginate and magnesium sulfate were added to the reaction mixture at the initiation of the polymerization, the results shown in Table 4 below.

TABLE 4

| Examples | 1 | 2 |
|---|---|---|
| Sodium alginate (parts by weight) | 0.001 | 0.002 |
| Magnesium sulfate (parts by weight) | 0.02 | 0.02 |
| Polymerization time (hr.) | 59 | 60 |
| Total solid amount (percent) | 59.9 | 60.5 |
| Viscosity (cps.) | 290 | 230 |
| Viscosity at 55% total solid content (cps.) | 90 | 75 |
| Coagulated material | None | None |

From Table 4, it is apparent that a latex having a high concentration of polymer particles and low vicosity may be produced with a good reproducibility according to the present invention.

EXAMPLE 3

75 parts butadiene, 25 parts styrene, 53 parts water, one part disproportionated sodium rosinate, 0.25 part n-dodecylmercaptan, 0.3 part potassium persulfate, 0.001 part sodium alginate and 0.02 part magnesium chloride were put in a 20 l. glass-lined autoclave provided with a stirrer, and the polymerization started at 46° C. The temperature was increased to 52° C. after 24 hours and to 66° C. after 36 hours. When the conversion of butadiene reached 45%, 0.25 part potassium oleate in 1 part water was added. Also when it reached 60%, "Booster" consisting of 0.1 part n-dodecylmercaptan, 0.1 part potassium persulfate, 0.5 part potassium oleate and 4 parts water was added with an addition of 0.75 part potassium rosinate. 63 hours after the initiation, a latex having a property of Table 5 was obtained, which had a total content of solid of 59.8%.

TABLE 5

| | |
|---|---|
| Total solid content (percent) | 59.8 |
| Viscosity (cps.) | 170 |
| Viscosity at 55% total solid content (cps.) | 50 |
| Surface tension (dyne/cm.) | 49 |
| pH | 9.8 |
| Mechanical stability (percent)[1] | 0 |
| Distribution of particle size (percent)[2]: | |
| Less than 0.1μ | 3 |
| 0.1μ–0.2μ | 25 |
| 0.2μ–0.3μ | 32 |
| 0.3μ–0.4μ | 7 |
| 0.4μ–0.8μ | 23 |
| 0.8μ and over | 10 |

[1] Measured by the method proposed by Maron et al., "Analytical Chemistry," vol. 25, No. 7, p. 1087 (1953).
[2] Measured by creaming method described by Schmidt et al., "Rubber Chemistry and Technology," vol. 34, p. 433 (1961).

The results shown in Table 5 indicate that the method of the present invention can produce latex having high concentration of large polymer particles and a low viscosity. Moreover, the latex does not contain much electrolyte and is stable even though the amount of emulsifier contained is small, making the latex suitable for formation of films or as a raw material latex for the production of ABS resin.

EXAMPLE 4

A mixture of 70 parts butadiene, 30 parts n-butylacrylate, 55 parts water, one part sodium oleate, 0.3 part n-dodecylmercaptan, 0.3 part potassium persulfate, 0.001 part sodium alginate and 0.03 part of magnesium nitrate was put in a 10 l. glass-lined autoclave having an agitator and the polymerization was initiated at 46° C. After 24 hours of polymerization, the temperature was increased to 56° C. and after 40 hours to 66° C. When the conversion of the butadiene reached 40%, 0.5 part of potassium oleate was supplemented and when it reached 60%, the "Booster" was added. The "Booster" had the composition shown in Example 3. After 59 hours of polymerization, a latex with the total solid content of 57.8% was obtained. The viscosity was 295 cps.

EXAMPLE 5

The same procedure as described in Example 3 was followed except that 100 parts butadiene, 53 parts water, 1 part disproportionated sodium rosinate, 0.2 part t-dodecylmercaptan, 0.3 part potassium persulfate, 0.0005 part ammonium alginate and 0.01 part magnesium sulfate were introduced to a 20 l. glass-lined autoclave provided with a stirrer and the polymerization was initiated at 48° C.

The procedure was repeated under the same condition and the properties of the resulting latex is compared in Table 6.

TABLE 6

| | | |
|---|---|---|
| Total solid content (percent) | 60.2 | 59.9 |
| Viscosity (cps.) | 245 | 180 |
| Viscosity at 55% total solid content | 80 | 55 |
| Distribution of particle size (percent): | | |
| Less than $0.1\mu$ | 3 | 4 |
| $0.1\mu$–$0.2\mu$ | 24 | 23 |
| $0.2\mu$–$0.3\mu$ | 33 | 33 |
| $0.3\mu$–$0.4\mu$ | 10 | 7 |
| $0.4\mu$–$0.8\mu$ | 20 | 23 |
| $0.8\mu$ and up | 10 | 10 |

Table 6 proves that the method of the present invention offers an excellent reproducibility for the distribution of particle size.

What is claimed is:

1. A method of directly producing synthetic rubber latex having a high concentration of large polymer particles and a low viscosity characterized by polymerizing aliphatic conjugated diolefin or a mixture of aliphatic conjugated diolefin and vinyl compound in an aqueous medium wherein the ratio of monomers to water is from 0.8 to 1.5 using fatty acid soap, rosin soap or a mixture thereof as the emulsifier, in the presence of from 0.00001 to 0.1 part by weight, per 100 parts of monomer, of water-soluble alginate and from $1 \times 10^{-5}$ to $1 \times 10^{-3}$ moles, per 100 parts by weight of monomer of water-soluble magnesium salt, said vinyl compound being selected from the group consisting of styrene; α-methylstyrene; divinylbenzene; acrylonitrile; and acrylic and methacrylic acids and their alkyl esters wherein the alkyl group contains up to four carbon atoms.

2. The method according to claim 1 wherein the water-soluble alginate is selected from a group consisting of sodium, ammonium and magnesium salts of alginic acid, and the water-soluble magnesium salt is selected from a group consisting of magnesium chloride, magnesium bromide, magnesium sulfate, magnesium nitrate, magnesium chromate, magnesium formate, and magnesium acetate.

References Cited

UNITED STATES PATENTS

| 2,473,929 | 6/1949 | Wilson | 260—17.4 ST |
| 3,049,500 | 8/1962 | Howland et al. | 260—17.4 BB |
| 2,498,694 | 2/1950 | Mast | 260—17.4 ST |
| 3,607,807 | 9/1971 | Huddleston | 260—23.7 A |
| 3,236,800 | 2/1966 | Waterman et al. | 260—892 |

OTHER REFERENCES

Chem. Abstracts: vol. 75:65068w, Araki et al., "Concentrated Latexes With Low Viscosity."

WILLIAM H. SHORT, Primary Examiner

E. WOODBERRY, Assistant Examiner

U.S. Cl. X.R.

117—161 UZ; 260—17.4 ST, 23.7 A, B, 27 BB, 29.7 B, UA, 82.1, 82.3, 83.5, 83.7, 94.3